United States Patent [19]
Shimazaki et al.

[11] Patent Number: 5,649,610
[45] Date of Patent: Jul. 22, 1997

[54] PAD CLIP FOR A DISC BRAKE

[75] Inventors: Toru Shimazaki, Aichi-pref.; Masayoshi Katagiri, Toyota; Yasuyuki Hanai, Kariya; Kenji Urata, Anjo; Hideo Akao, Chiryu; Toshitaka Suga, Nagoya; Naoki Mouri, Kariya; Hiroshi Anda, Nagoya; Yuichi Takeo, Toyota, all of Japan

[73] Assignee: Aisin Seiki Kabushiki Kaisha, Kariya, Japan

[21] Appl. No.: 453,970

[22] Filed: May 30, 1995

[30] Foreign Application Priority Data

Jun. 29, 1994 [JP] Japan ................................. 6-148286
Mar. 31, 1995 [JP] Japan ................................. 7-075847

[51] Int. Cl.⁶ .............................................. F16D 65/40
[52] U.S. Cl. ................................ 188/73.38; 188/73.36
[58] Field of Search ............................. 188/73.38, 73.36

[56] References Cited

U.S. PATENT DOCUMENTS

| 4,214,649 | 7/1980 | Fujimori et al. | |
| 4,371,060 | 2/1983 | Iwata | 188/73.38 |
| 4,607,728 | 8/1986 | Kobayashi | 188/73.38 |
| 4,699,254 | 10/1987 | Mery | 188/73.38 |
| 5,025,897 | 6/1991 | Hirashita et al. | 188/73.38 |
| 5,377,790 | 1/1995 | Tsuruta | 188/73.38 |
| 5,381,875 | 1/1995 | Tsuruta et al. | 188/73.38 |

FOREIGN PATENT DOCUMENTS

| 52-121488 | 3/1951 | Japan . |
| 53-86969 | 7/1978 | Japan . |
| 54-35566 | 3/1979 | Japan . |
| 61-14662 | 3/1984 | Japan . |
| 2-2097 | 1/1990 | Japan . |

*Primary Examiner*—Matthew C. Graham
*Attorney, Agent, or Firm*—Oblon, Spivak, McClelland, Maier & Neustadt, P.C.

[57] ABSTRACT

A pad clip for a disc brake includes a base portion for engaging with a concave portion of a mounting member of the disc brake, a spring portion which extends from the base portion for forcing a projection portion of a disc pad of the disc brake which is fit into the concave portion in the radial direction of the wheel and a curved extension portion which connects the spring portion to the base portion.

5 Claims, 4 Drawing Sheets 5,649,610

PAD CLIP FOR A DISC BRAKE

BACKGROUND OF THE INVENTION

1. Field of the Invention

This invention relates to a pad clip for a disc brake and more particularly to a pad clip for a disc brake of a vehicle.

2. Discussion of the Background

A conventional pad clip for a disc brake is disclosed in Japanese Patent Laid Open No. 54 (1979) -35566 (second embodiment). The pad clip for a disc brake of the prior art comprises a fitting portion for engagement with a rectangular concave portion of a mounting member which is installed on a stationary member of a vehicle wheel. The pad clip for a disc brake of the prior art further comprises a spring portion which extends from the fitting portion so as to bias an inner circumferential portion of a disc pad in the outward radial direction of the wheel.

Because the spring portion of the pad clip for a disc brake described above biases the inner circumferential portion of the disc pad, the spring portion must be large. Therefore, when the pad clip is punched out from a metal plate, a large percentage of the metal plate is wasted.

Another conventional pad clip for a disc brake is disclosed in the Japanese Utility Model No. 2 (1990)-2097. This pad clip comprises a spring portion biasing a projection portion of a disc pad fit into a concave portion of a mounting member in the outer radial direction of the wheel. Therefore, the pad clip does not include an enlarged spring portion, which reduces the percentage of the metal plate which is thrown away.

The spring force of the spring portion which forces the projection portion of the disc pad must be larger than a predetermined value so as to prevent the spring portion from being damaged by vibration of the disc pad due to moving of the vehicle. After the pad clip is fit into the concave portion of the mounting member, the spring portion of the pad clip is pressed, against the spring force thereof, in order to insert the projection portion of the disc pad into the pad clip. Therefore, the disc brake is not convenient to be assembled due to the large spring force of the spring portion.

SUMMARY OF THE INVENTION

It is an object of the present invention to provide a pad clip for a disc brake which can save materials forming the pad clip.

It is another object of the present invention to provide a pad clip for a disc brake which is convenient to be fit on a mounting member of a disc brake.

It is a further object of the present invention to provide a pad clip for a disc brake which is durable.

It is a further object of the present invention to provide a pad clip for a disc brake which is simple in structure and small in size.

It is a further object of the present invention to provide a pad clip for a disc brake which is low in cost.

To achieve the above and other objects, a pad clip for a disc brake in accordance with this invention comprises a base portion for engagement with a concave portion of a mounting member of the disc brake, a spring portion which extends from the base portion for forcing a projection portion of a disc pad of the disc brake which is fit into the concave portion in the radial direction of the wheel and a curved extension portion which connects the spring portion to the base portion.

BRIEF DESCRIPTION OF THE DRAWINGS

The features and advantages of the pad clip for a disc brake according to the present invention will be more clearly appreciated from the following description in conjunction with the accompanying drawings wherein.

DESCRIPTION OF THE PREFERRED EMBODIMENTS

Figure 1:
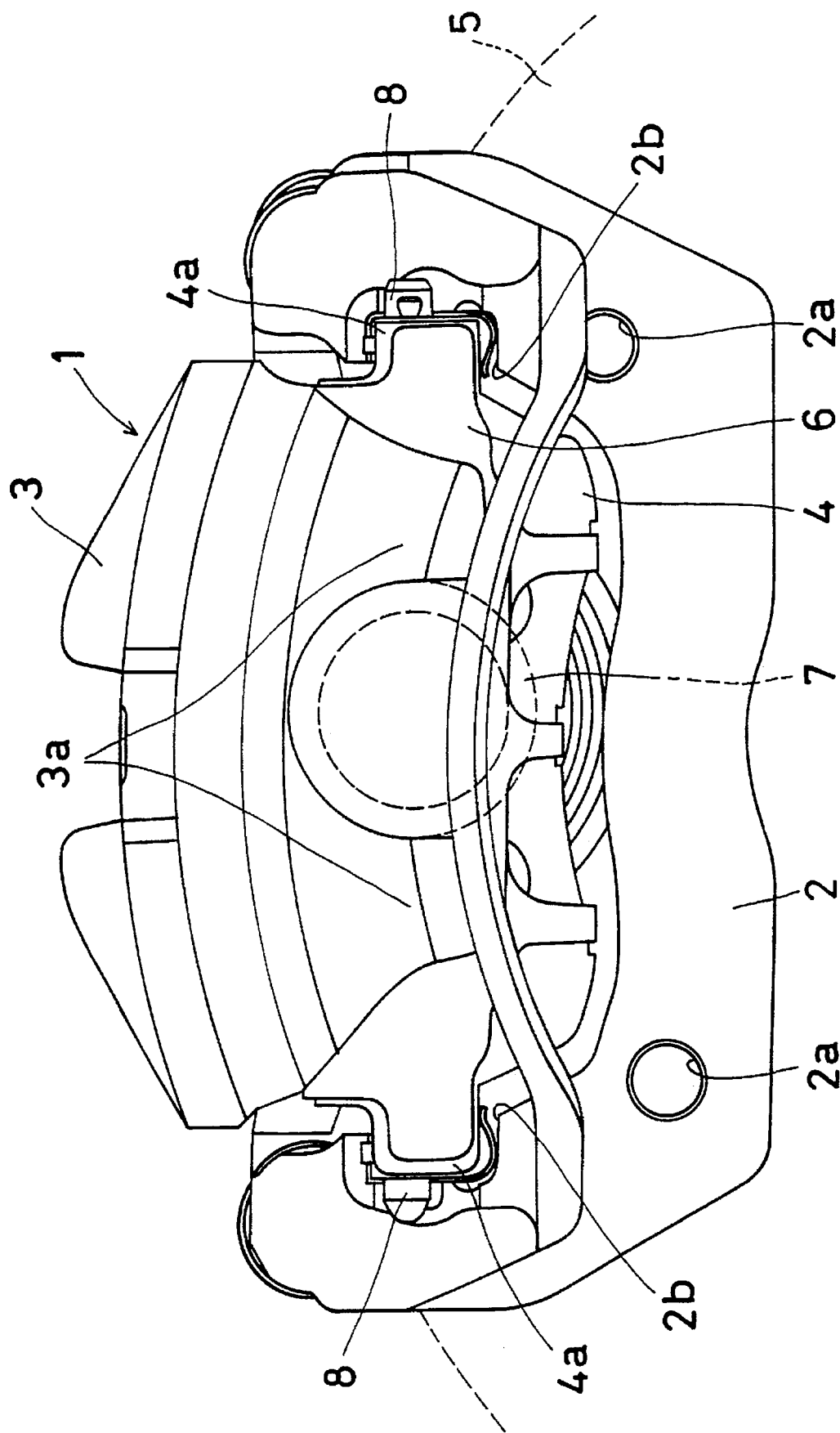
FIG. 1 is an elevational view of a disc brake including a pad clip for a disc brake of the present invention.

With reference to FIG. 1, a disc brake 1 comprises a mounting member 2 mounted on a stationary member of a vehicle wheel through a pair of mounting holes 2a, a cylinder body 3 installed on the mounting member 2 so as to be able to slide in the axial direction of the vehicle wheel, a (outer) disc pad 4 including a pair of projection portions 4a, each of which is fit into a concave portion 2b of the mounting member 2 in order that the disc pad 4 is mounted on the mounting member 2 so as to be able to slide in the axial direction of the vehicle wheel and a (inner) disc pad (not shown in the FIGURES) so as to be disposed at the opposite side of the outer pad 4 with respect to a disc rotor 5 which rotates with the vehicle wheel. One side of a shim 6 is in contact with the disc pad 4. The other side of the the shim 6 is in contact with a reaction portion 3a of the cylinder body 3. The inner disc pad is in contact with a piston 7. During operation of the disc brake 1, the disc rotor 5 is pressed at both sides thereof by the outer disc pad 4 and the inner disc pad.

A pad clip 8 formed of an elastic material is disposed between each of the projection portions 4a of the outer disc pad 4 and each of the concave portions 2b of the mounting member 2 so as to force the projection portions 4a in the outward radial direction of the wheel (in the upward direction of FIG. 1). It is preferable that a pad clip 8 is also disposed between each of the projection portions of the inner disc pad and each of the concave portions 2b of the mounting member 2.

Figure 2:
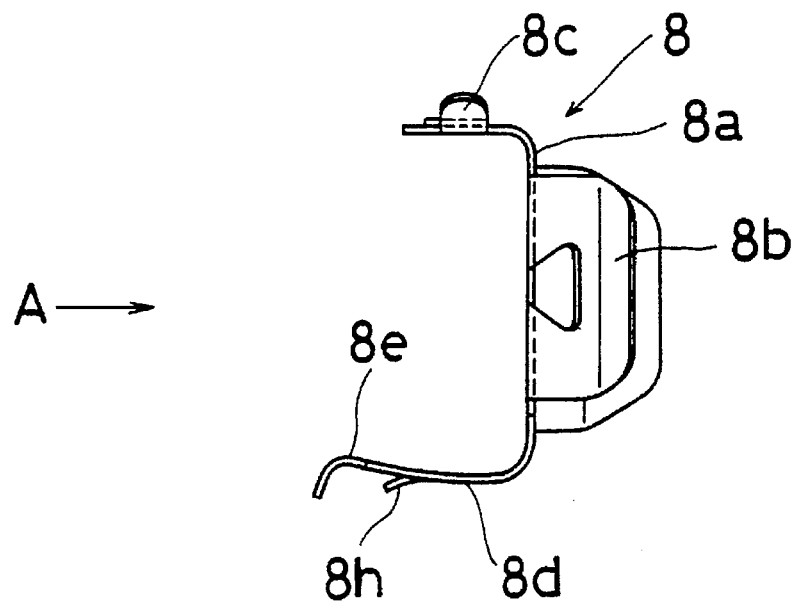
FIG. 2 is an enlarged elevational view of a pad clip for a disc brake of the present invention.

The pad clip 8 will be described in detail hereinafter. The pad clip 8 includes a base portion 8a which is formed into an L-shaped configuration as shown in FIG. 2. The pad clip 8 further includes a pair of clip portions 8b and a bending portion 8c which are formed integrally with the base portion 8a. The clip portions 8b are engaged with the concave portion 2b of the mounting member 2 and the bending portion 8c is projected from an end portion of the mounting member 2 when the pad clip 8 is mounted on the mounting member 2.

Figure 3:
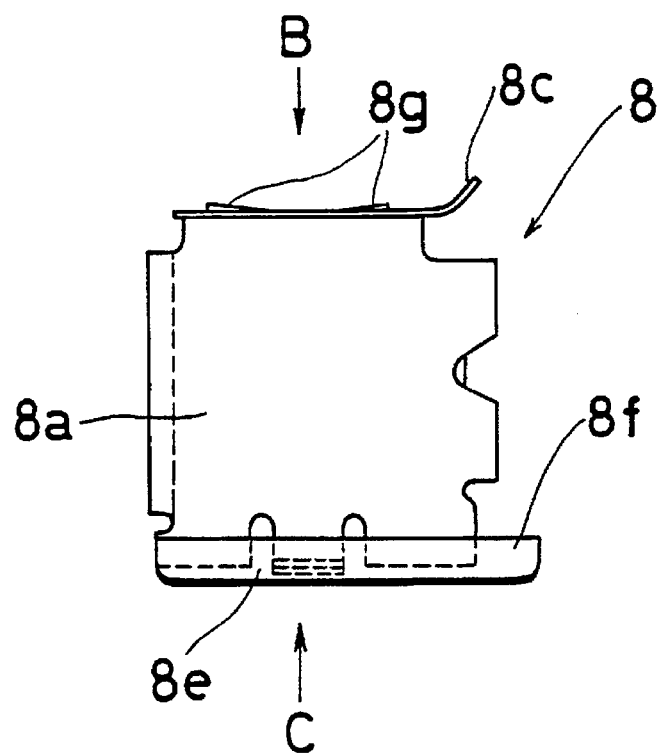
FIG. 3 is a view taken in the direction of the arrow A of FIG. 2.
Figure 4:
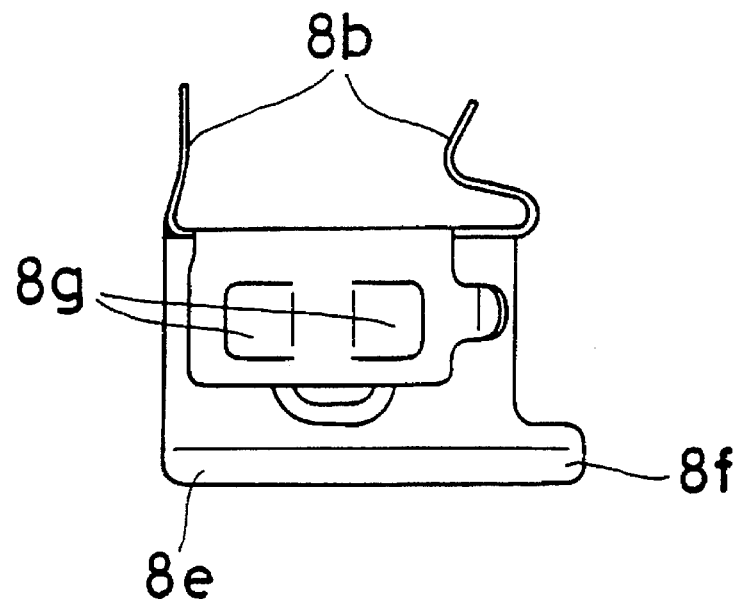
FIG. 4 is a view taken in the direction of the arrow B of FIG. 3.

A curved extension portion 8d is extended from the base portion 8a. The extension portion 8d is curved such that it is concave on the side facing the disc pad. The extension portion 8d has a spring portion 8e at a tip thereof which biases the projection portion 4a in the outward radial direction of the wheel when the pad clip 8 is mounted on the mounting member 2. As shown in FIGS. 3 and 4, the spring portion 8e includes an operation end 8f at an end portion thereof in order to press the spring portion 8e when the projection portion 4a of the disc pad 4 is inserted into the pad clip 8 which is installed on the concave portion 2b of the mounting member 2.

The pad clip 8 further includes a pair of pick portions 8g (shown in FIGS. 3 and 4) so as to be in contact with the concave portion 2b of the mounting member 2. The pick portions 8g prevent the pad clip 8 from being moved in the axial direction of the wheel (in the right and left direction of FIG. 3) against a force in the rotational direction of the disc rotor 5 applied to the base portion 8a of the pad clip 8 from the projection portion 4a of the disc pad 4 when the disc brake 1 is operated.

Figure 5:
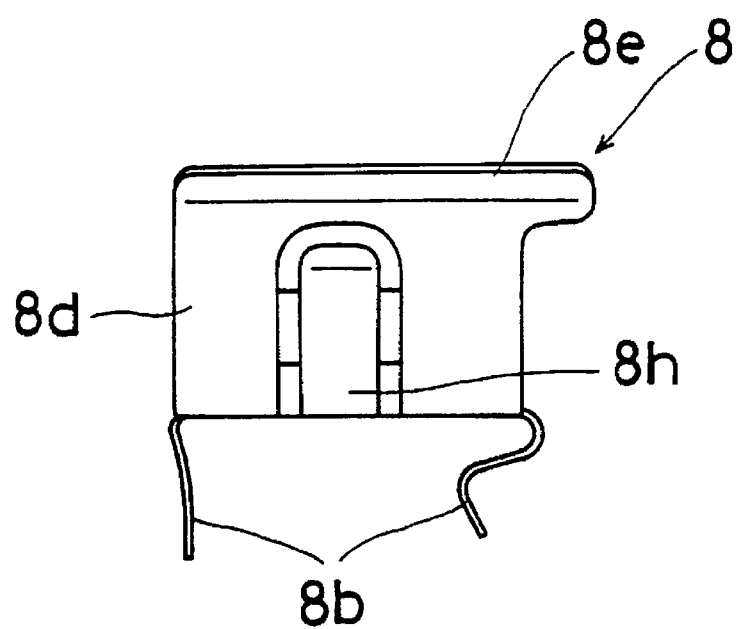
FIG. 5 is a view taken in the direction of the arrow C of FIG. 3.

Further the pad clip 8 includes a support portion 8h (shown in FIG. 5) which is formed integrally with the base portion 8a so as to project in the lower direction as shown in FIG. 2. The support portion 8h presses on the concave portion 2b of the mounting member 2 when the pad clip 8 is mounted on the concave portion 2b. The function of the support portion will be described later.

Figure 6:
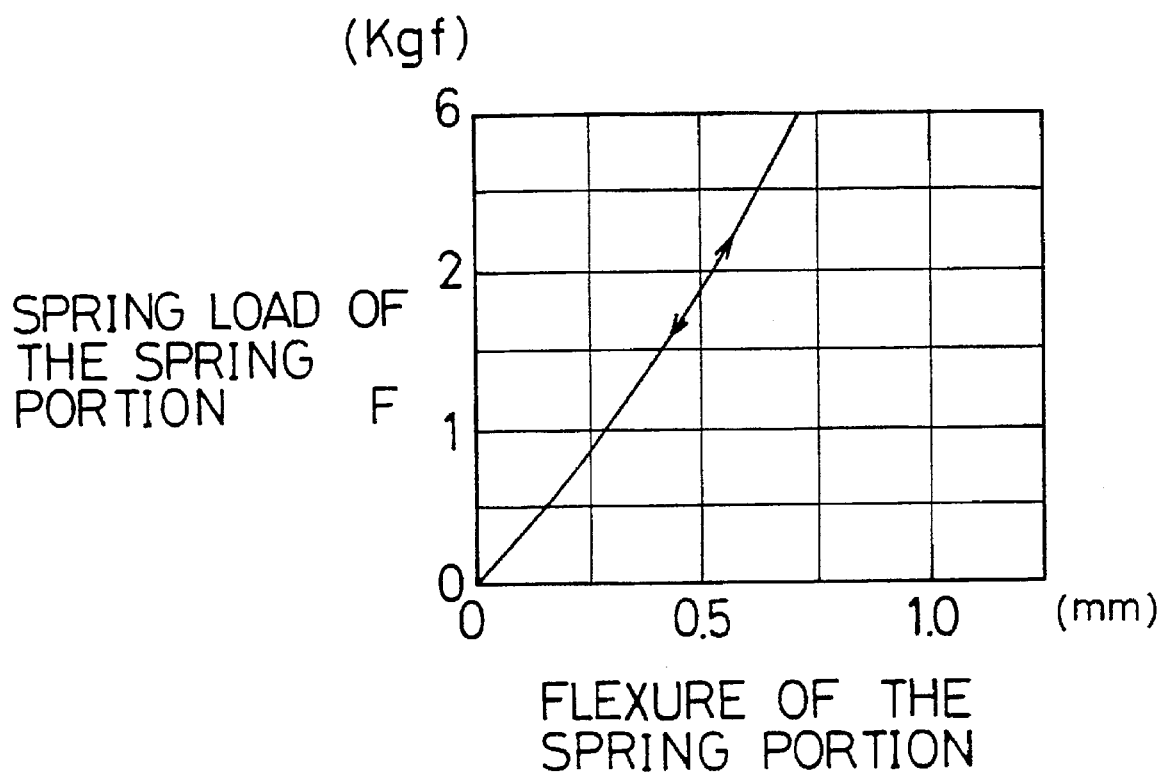
FIG. 6 is a diagram showing a relation between the flexure and the spring load of the spring portion.

A characteristic of relation between a flexure and a spring load of the spring portion 8e when the pad clip 8 is mounted on the concave portion 2b is shown in FIG. 6. Due to the curvature of the extension portion 8d, the length of the extension portion 8d which is in contact with the concave portion 2b increases in the direction of the spring portion 8e from the base portion 8a in proportion to a quantity of the flexure of the spring portion 8e. The portion of the extension portion 8d which is able to bend thereby decreases. Therefore, the characteristic of the relation between the flexure and the spring load of the spring portion 8e is not linear, as seen in FIG. 6. Instead, a spring rate of the spring portion 8e increases in proportion to a quantity of the flexure of the spring portion 8e.

The operation end 8f of the pad clip 8 is pressed in the lower direction of FIGS. 1 and 2 so as to bend the spring portion 8e when the projection portion 4a of the disc pad 4 is inserted into the pad clip 8 which is installed on the concave portion 2b of the mounting member 2. At this time, the spring load of the spring portion 8e is small because the degree of flexure of the spring portion 8e is small. Therefore, the projection portion 4a of the disc pad 4 can be easily inserted into the pad clip 8.

A rotation moment in the counterclockwise direction shown in FIG. 2 is applied to the pad clip 8 when the operation end 8f is pressed in the lower direction. However, the pad clip 8 is not disengaged from the concave portion 2b of the mounting member 2 because the support portion 8h presses on the concave portion 2b.

Vibration of the disc pad 4 engaged with the pad clip 8 increases a quantity of the flexure of the spring portion 8e of the pad clip 8 in order that a part of the curved extension portion 8d including a distal portion of the spring portion 8e is in contact with the concave portion 2b when the wheel is vibrated. Because the length of the extension portion 8d to be able to bend is decreased, the spring rate of the spring portion 8e is increased. Therefore, the disc pad 4 can be steadily supported by the large spring load of the spring portion 8e. Further, the spring portion 8e of the pad clip 8 is not damaged by the large flexure thereof.

The pad clip 8 can instead force the projection portion 4a of the disc pad 4 in the inward radial direction of the vehicle wheel.

In accordance with a pad clip for a disc brake of the invention, the pad clip can be small in size so as to reduce weight of the disc brake including the pad clip.

Further, because the pad clip can be easily a mounted on the mounting member, the disc brake including the pad clip can be less expensive.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A pad clip for a disc brake for a wheel, comprising:

a base portion for engaging with a concave portion of a mounting member of the disc brake;

a spring portion which extends from the base portion for pressing a projection portion of a disc pad of the disc brake in a radial direction of the wheel when the disc pad is fit into the concave portion having the pad clip therein; and a curved extension portion which connects the spring portion to the base portion, wherein the curved extension portion extends in a chord direction of the wheel and is curved such that it is concave on the side facing the disc pad and the length of the curved extension portion which is in contact with the concave portion of the mounting member increases in the direction of the spring portion from the base portion in proportion to a quantity of the flexure of the spring portion.

2. A pad clip for a disc brake as recited in claim 1, wherein the pad clip further comprises a pick portion for preventing the pad clip from being moved in the axial direction of the wheel relative to the mounting member when the pad clip is housed in the concave portion.

3. A pad clip for a disc brake as recited in claim 1, wherein the pad clip further comprises a support portion for pressing the concave portion of the mounting member, the support portion projecting from the base portion.

4. A pad clip for a disc brake as recited in claim 1, wherein the pad clip further comprises a pair of pick portions for preventing the pad clip from being moved in the axial direction of the wheel relative to the mounting member when the pad clip is housed in the concave portion, the pick portions being oriented opposite to each other in the axial direction of the wheel.

5. A disc brake for a vehicle having a wheel, comprising:

a mounting member to be mounted on a stationary member of the vehicle, the mounting member including a concave portion;

a cylinder body slidably installed on the mounting member;

a piston slidably disposed in the cylinder body;

a disc pad including a projection portion which is fit into the concave portion of the mounting member; and a pad clip disposed between the concave portion of the mounting member and the projection portion of the disc pad, the pad clip including a base portion engaging with the concave portion of the mounting member, a spring portion which extends from the base portion and presses the projection portion of the disc pad in the radial direction of the wheel and a curved extension portion which connects the spring portion to the base portion, wherein the curved extension portion extends in a chord direction of the wheel and is curved such that it is concave on the side facing the disc pad and the length of the curved extension portion which is in contact with the concave portion of the mounting member increases in the direction of the spring portion from the base portion in proportion to a quantity of the flexure of the spring portion.

* * * * *